United States Patent [11] 3,600,518

[72] Inventors Joseph H. McNeilly
HarlowEssex;
Roger A. Manship, Stortford, both of, England
[21] Appl. No. 826,316
[22] Filed May 21, 1969
[45] Patented Aug. 17, 1971
[73] Assignee International Standard Electric Corp.
New York, N.Y.
[32] Priority May 23, 1968
[33] Great Britain
[31] 24,694/68

[54] SUBSCRIBER SUBSET FOR PCM TELEPHONE SYSTEM
6 Claims, 3 Drawing Figs.

[52] U.S. Cl. .......... 179/15 AL
[51] Int. Cl. .......... H04j 3/08
[50] Field of Search .......... 179/15 AL; 340/172.5

[56] References Cited
UNITED STATES PATENTS

| | | | |
|---|---|---|---|
| 3,458,661 | 7/1969 | Forde et al. | 179/15 (AL) |
| 3,483,329 | 12/1969 | Hunkins et al. | 179/15 (AL) |
| 3,519,750 | 7/1970 | Beresin | 179/15 (AL) |

*Primary Examiner*—Kathleen H. Claffy
*Assistant Examiner*—David L. Stewart
*Attorneys*—C. Cornell Remsen, Jr., Walter J. Baum, Percy P. Lantzy, J. Warren Whitesel, Delbert P. Warner and James B. Raden

ABSTRACT: In a pulse code modulated telephone system subscriber sets are connected in series and each subscriber is responsive to its own unique call numbers in any time slot. Each called subscriber returns a modified signal in the same time slot to indicate the call has been received.

Fig 2

J. H. McNEILLY
R. A. MANSHIP
Inventors

By O. A. Warner
Attorney

SUBSCRIBER SUBSET FOR PCM TELEPHONE SYSTEM

This invention relates to a subscriber subset for a PCM telephone system in which a group of subscribers have access to a common "ring main" loop line arranged for the continuous unidirectional circulation of multiplexed PCM signals.

Subscribers on the loop communicate with one another by seizing a free time slot in the loop. Signals from a first subscriber destined for a second subscriber are transmitted around the loop as far as the second subscriber, where they are terminated, and signals from the second subscriber are transmitted around the remainder of the loop to the first subscriber and there terminated. If a subscriber is already engaged on one channel all other signals pass by that subscriber and continue round the loop. The system makes use of subscriber equipments which incorporate individual pulse modulating and demodulating means, i.e. each subset includes a PCM coder and decoder. The advent of integrated solid state circuits enables such coders/decoders to be built into conventional sized telephone sets alongside other digital apparatus such as synchronizing, dialling and other circuits which can also be constructed in integrated circuits.

According to this invention there is provided a subscriber subset for a PCM telephone system of the type set forth, the subset including means for generating different binary code groups each representing the number of another subscriber, means for examining all the signals in the loop when the subset is not already engaged to ascertain the presence in one channel of the binary code group representing its own number, means for altering and retransmitting in the same channel the altered code group if the subset is not engaged, and means for indicating the condition of a binary code group originating at that subset and relating to another subset when that code group is subsequently returned to the originating subset.

The above-mentioned and other features of the invention and the manner of attaining them will become more apparent and the invention itself will be best understood by reference to the following description taken in conjunction with the accompanying drawings, wherein.

Figure 1:
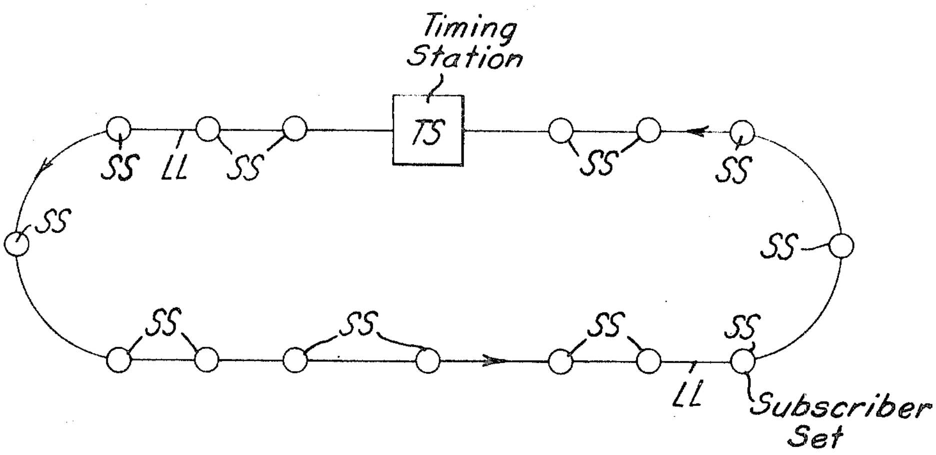
FIG. 1 is a diagrammatic illustration of the layout of a PCM telephone system of the type set forth above.

The basic network is shown in FIG. 1 and consists of a number of subscribers SS connected to one another by a closed loop unidirectional transmission line LL. The loop includes a timing station TS the function of which is to provide a number of time multiplexed channels in the loop. Each subscriber SS has access to any unused channel for the purposes of making a connection and each subscriber is responsive to his unique identification signal appearing on any channel to cause a connection to be completed. Once a channel has been seized for a particular connection it is retained by that connection until the connection is terminated and it is not available for any other subscribers.

Figure 2:
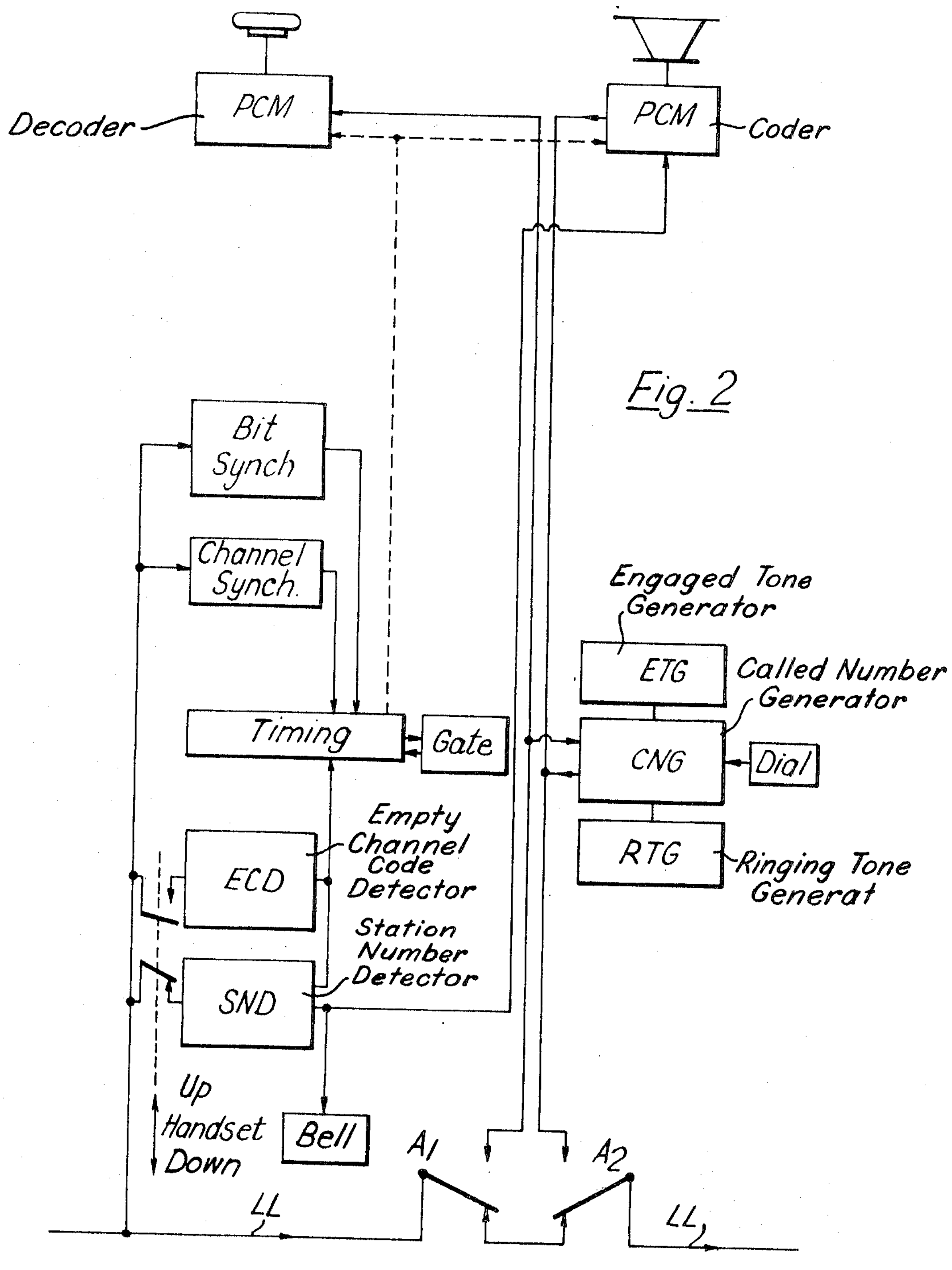
FIG. 2 is a block diagram of a subscriber subset.

A typical subscriber station SS is illustrated in FIG. 2. The station consists essentially of a conventional telephone instrument which has built into its integrated solid state circuits performing the necessary switching and other functions required by the ring main system. Thus the microphone and earpiece are provided with a PCM coder and decoder respectively, and these are connected to the line LL by solid state switches $A_1$ and $A_2$ at the appropriate moments to synchronize with a channel on the line. The subscriber station must also include an empty channel code detector ECD, a station number detector SND, a ringing tone generator RTG, and engaged tone generator ETG, a called member generator CNG, and timing and synchronizing circuits. The various individual circuits will be described in greater detail later.

The operation of the system is briefly as follows. When a subscriber wishes to make a connection he lifts the handset and dials the number wanted. On pushing the last button (always a7) the empty channel detector locates an empty channel on the line. The subset locks onto this channel and inserts into this channel the number dialled, which has been converted into a code group by the called number generator CNG, via line switches $A_1$, Aevery time this channel appears. By putting a number into the channel it is made unavailable to any other subscriber wishing to make a call. At the called subscriber station the number is recognized by the station number detector SND and the called subscriber's timing and synchronizing circuits start connecting the called subscriber to the line at every occurrence of the appropriate channel. At the same time the station number detector activates the called subscriber's bell and the subset feeds back into the line, via the called subscriber's PCM coder, a signal which conveys to the listening calling subscriber the fact that the called subscriber's number is being rung. At the calling subscriber this signal activates a ringing tone generator. When the called subscriber answers the connection is completed, and when the connection is terminated the channel is released ready for another connection.

The subcriber set is equipped with nine pushbuttons. Button number 9 is always pushed first when making a call and acts merely as an interlock switch which, amongst other things, initially inhibits the speech coder. Seven buttons are available for making up different code combinations and dialling is always terminated by pressing button number 7. This button causes the subset to lock onto an empty channel the seven button combination, which has been stored on a register, to be sent to the line via line gate A2. Thus all the subscribers' numbers always start with 9 and end with 7. The total number of binary combinations available for the remaining seven buttons is 127, allowing for the fact that 0000000 would not be used for practical reasons.

Also, in practice not all available codes are used for subscriber's numbers as some special codes are required for other purposes such as synchronization etc.

The number code is an 8-bit binary code and the second bit is always a '1' when the number is put on the line by the calling subscriber. Bit number 2 is conveniently set up by button number 7 (remembering that button number 7 is always pushed last when setting up the number to be called). If the called subscriber is engaged on a different channel the loop will not be broken when the number reaches the called subscriber and the number will eventually return unaltered to the calling subscriber.

However if the called subscriber is free then all the line signals are fed into a shift register and examined. If the called subscriber set recognizes its own number it breaks the loop, inverts bit number 2 and returns the altered number to the line. At the calling station it is only necessary to compare the sent and received signals to ascertain whether the called subscriber is engaged or ringing Bits 1 and 3—8 must be the same as sent in both cases, and bit 2 is changed if the called subscriber is free and "ringing."

To achieve this inversion of bit 2 each subscriber subset is arranged as follows. All the line signals in each channel are fed into a shift register where they are examined to detect the subset's own number. During this time the bistable in which bit number 2 is stored is reset for every channel. If no number is detected the contents of the shift register are lost and the line gates A1, A2 do not break the line. If a number is recognized by a set of coincidence gates associated with the register, line gates A1 and A2 are operated and the line is broken during the next frame. The contents of the shift register, with bit 2 inverted, are sent onto the line and replaced in the shift register by the repetition of the number in that frame.

At the calling subscriber all the signals returned from the line are entered in a shift register and compared with the number as originally sent.

Timing pulses $P_1$ to $P_4$ occur in the synchronizing channel, and occur in the sequence 1, 2, 3, 4. During the dialling operation the speech coder counter input is inhibited by the pressing of button 9 and this counter is used as a store for the 8-bit number. Each of the remaining eight pushbuttons reads directly into a flip-flop of the counter, with button 7 reading into the second flip-flop. This stored information is read into a shift-register at the end of the synchronizing channel by pulse $P_4$ and each time the subset locks onto the appropriate channel the contents of the shift register are sent to the line via gate A2. The returning signals (originated in an earlier frame) received from the line are simultaneously read into the shift register and a comparison is then made between the contents of the shift register and the stored number.

Figure 3:
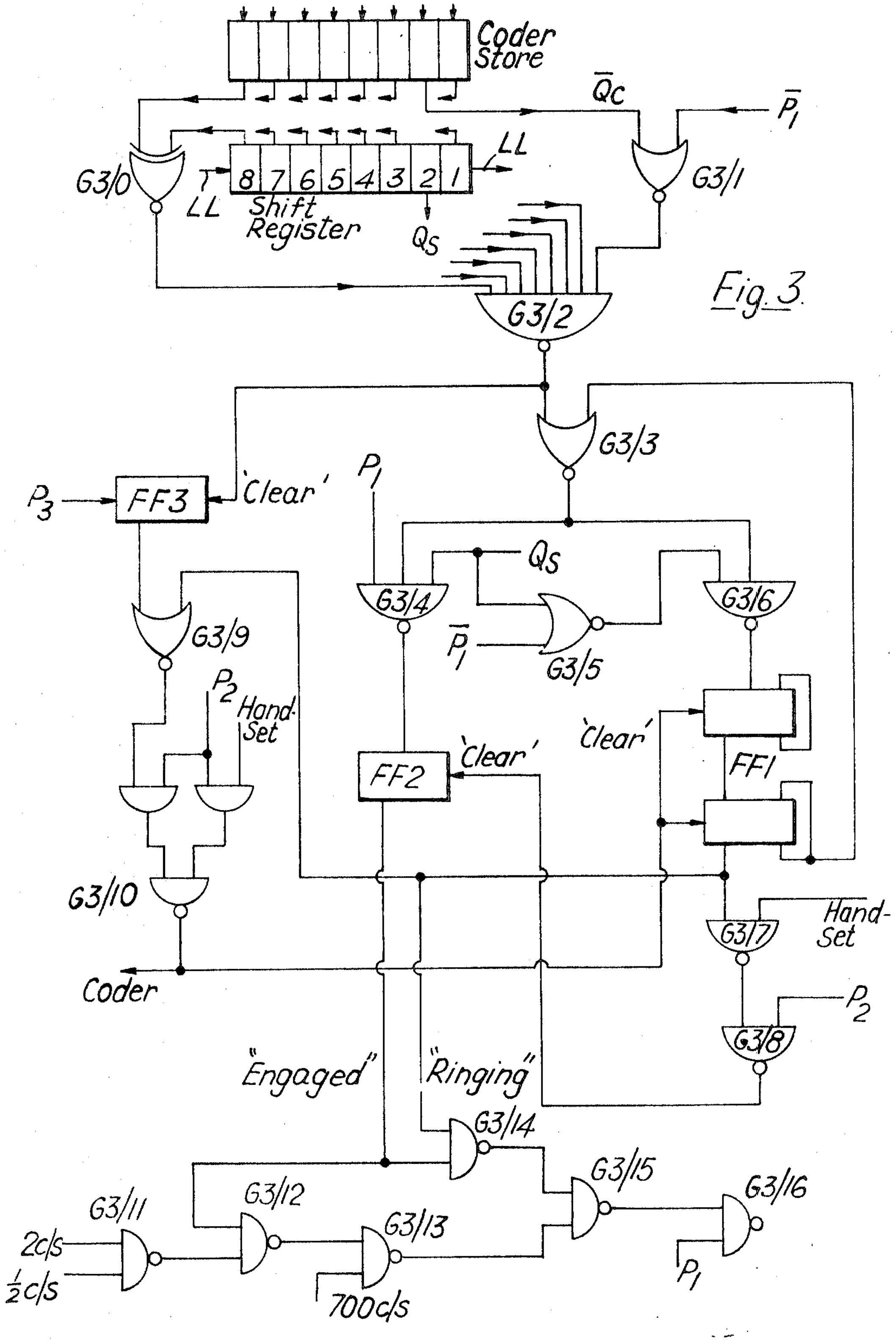
FIG. 3 is a block diagram of the ringing and engaged tone circuits in a subscriber subset.

The operation of the ringing and engaged tone circuits is shown in FIG. 3. The outputs of the seven coincidence gates G3/0 comparing bits 1 and 3—8 are fed to an 8-input NAND-gate G3/2. If bit 2 has been set (indicating that a number has been dialled) then gate G3/1 responds to the inputs $\overline{P}_1$ and $\overline{Q}_c$, where $Q_c$ is '1' of bit 2 in the coder store. This allows gate G3/2 to open if the other bits show coincidence and an output is is sent to a pair of steering gates G3/4, G3/6. Depending on whether bit 2 in the shift register is a '1' or a '0' then either a "ringing" or "engaged" flip-flop is set. If bit 2 is a '1' then the input $Q_s$(bit 2 in the shift register) enables the "ringing" flip-flop FF1 via gate G3/6. This flip-flop in fact consists of two conventional flip-flops wired up as a counter so that at least two consecutive recognitions have to be made before it is finally set. After FFI is set the feedback loop to gate G3/3 prevents further inputs gate the counter. If $\overline{Q}_s$ appears then gate G3/4 is enabled and sets the " engaged" flip-flop FF2.

Because of the delay in recognizing the number, FF2 is always set first, although this condition may not last for more than one frame. If FF1 is set subsequently then FF2 is reset via gates G3/7 and G3/8. Alternatively if the handset is replaced FF2 is also reset via gates G3/7 and G3/8.

If the called party replies then coincidence between bits 1 and 3 —8 disappears and the output of gate G3/2 is altered and a reply flip-flop FF3 sets gates G3/9 and G3/10 to reset FF1. This clears the ringing tone and switches on the PCM coder for speech coding. The same result is achieved if the originating caller, failing to get a reply, replaces his handset. Gate 10 is then enabled and FF1 is cleared.

FF3 is cleared by the output pulse of gate G3/2, as mentioned above, coincident with $P_1$ and is set by $P_3$. If FF1 is set gate G3/9 allows $P_2$ to sample the output of FF3 in gate G3/10. If the number is ringing or engaged FF3 is "clear" when $P_2$ samples it. However when the called party replies FF3 is no longer cleared and $P_2$ finds it set, thus clearing FF1. Also if the handset is replaced $P_2$ clears FF1 via gate G3/10.

The ringing and engaged tones are generated using two oscillators, one at approximately 700 c/s and the other at 2 c/s. The engaged tone is simply a continuous 700 c/s tone.

The ringing tone is achieved by gating together the 700 c/s tone with the 2 c/s tone and a 1/2 c/s signal derived by dividing the 2 c/s tone by four. This gives a composite signal which is effectively two quarter-second bursts of 700 c/s tone, repeated after an interval of 1 1/4 seconds. If the ringing tone flip-flop FF1 is set the 2 c/s and 1/2 c/s signals are combined in gate G3/11 and pass through gate G3/12 which is inhibited when FF2 is set. The combined 2 c/s and 1/2 c/s signals are then mixed with the 700 c/s signal in gate G3/13 and fed via gate G3/15 to gate G3/16 where $P_1$ is also applied. If FF2 is set gate G3/12 inhibits the 2 c/s and 1/2 c/s combined signal and G3/16 gates only the 700 c/s tone with $P_1$.

This pulse $P_1$ is either not present (usual case when dialling) or is used to gate the 700 c/s tone (engaged) or the composite tone (ringing). The output of gate 16, which is actually $P_1$ modulated by a 700 c/s (continuous or interrupted) square wave output, is used to reset digit 6 in the speech decoder store to a '0' condition. Since the decoder is normally set to "all ones" during dialling this means that the decoder is effectively switched between two levels, either continuously for an engaged signal or discontinuously for a ringing signal and it is the decoder output which is heard as the audio signal in the subscriber's receiver.

It should be noted that in the event of a calling subscriber receiving an engaged tone, if he leaves his handset off-hook when the called subscriber becomes free he will be rung immediately and the engaged tone will change to a ringing tone at the calling subscriber.

It is to be understood that the foregoing description of specific examples of this invention is made by way of example only and is not to be considered as a limitation on its scope.

We claim:

1. A subscriber subset for a PCM telephone system of the type employing a continuous loop comprising means for generating different binary code groups each representing the number of another subscriber, means for examining all the signals in the loop when the subset is not already engaged to ascertain the presence in any one channel of the binary code group representing its own number, means for altering the code group representing its own number and retransmitting in the same channel the altered code group if the subset is not engaged, and means for determining the altered or unaltered condition of a binary code group sent from said subset when that code group is subsequently returned to said subset.

2. A subset according to claim 1 wherein the means for examining the signals in the loop includes a shift register into which the signals for each channel are fed and gating logic arranged to sample the contents of the shift register during the occurrence of each channel and to respond to the appearance in the shift register of the code combination relating to the subset.

3. A subset according to claim 2 wherein the means for altering and retransmitting the code group includes means for inverting one bit of information in the shift register if the subset is not already engaged by a connection occurring in another channel.

4. A subset according to claim 1 including a store, a shift register, means for inserting in the shift register a binary code combination held in the store representing the number of another subscriber, means for transmitting that code combination in a channel seized by the subset, means for inserting into the shift register at the same time any code combinations received in the same channel, coincidence gating logic arranged to compare the received code combination in the shift register with the code combination held in the store and means responsive to the logic to indicate whether the combination in the register is the same as the combination is the store or is different in respect of one predetermined bit of information.

5. A subset according to claim 4 in which the means for indicating includes two oscillators of different frequencies, one of the oscillators generating an audible tone and the other oscillator generating a signal at a lower inaudible frequency and gating logic whereby the audible tone alone is continuously present in the subset receiver when one condition is indicated or the audible tone is gated by the inaudible signal to produce an interrupted tone in the receiver when the other condition is indicated.

6. A subset according to claim 5 including means for deriving from the lower frequency oscillator a frequency being a submultiple thereof and means for gating these frequencies with the audible tone when the other condition is indicated.